United States Patent
Youk et al.

(10) Patent No.: US 9,535,207 B2
(45) Date of Patent: Jan. 3, 2017

(54) BACKLIGHT UNIT FOR LIQUID CRYSTAL DISPLAY DEVICE

(75) Inventors: Shimkeun Youk, Seoul (KR);
Dongnyuck Park, Gyeonggi-do (KR);
Haeyong Jeong, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 276 days.

(21) Appl. No.: 13/529,331

(22) Filed: Jun. 21, 2012

(65) Prior Publication Data

US 2013/0070475 A1    Mar. 21, 2013

(30) Foreign Application Priority Data

Sep. 15, 2011    (KR) .................. 10-2011-0092978

(51) Int. Cl.
| | | |
|---|---|---|
| *G02F 1/1333* | (2006.01) | |
| *F21V 8/00* | (2006.01) | |
| *G02B 5/02* | (2006.01) | |
| *G02F 1/1335* | (2006.01) | |

(52) U.S. Cl.
CPC ........... *G02B 6/0088* (2013.01); *G02B 5/0242* (2013.01); *G02B 5/0278* (2013.01); *G02F 1/133308* (2013.01); *G02F 1/133615* (2013.01); *G02F 2001/133314* (2013.01); *G02F 2001/133322* (2013.01)

(58) Field of Classification Search
CPC ...... F21V 17/12; F21V 17/108; F21V 17/164; G02B 6/0088; G02F 2001/133314; G02F 2001/133322
USPC ......................................................... 362/602
See application file for complete search history.

(56) References Cited

U.S. PATENT DOCUMENTS

| | | | | |
|---|---|---|---|---|
| 6,292,239 | B1 * | 9/2001 | Nagamura et al. | 349/58 |
| 6,512,558 | B2 * | 1/2003 | Kim | 349/58 |
| 7,027,111 | B2 * | 4/2006 | Fukayama et al. | 349/58 |

(Continued)

FOREIGN PATENT DOCUMENTS

| | | |
|---|---|---|
| CN | 101278226 A | 10/2008 |
| CN | 102177391 A | 9/2011 |

(Continued)

OTHER PUBLICATIONS

Korean Office Action dated Oct. 22, 2012, for Korean patent application No. 10-2011-0092978.

(Continued)

*Primary Examiner* — Nimeshkumar Patel
*Assistant Examiner* — Christopher Raabe
(74) *Attorney, Agent, or Firm* — Morgan, Lewis & Bockius LLP

(57) ABSTRACT

A backlight unit for a liquid crystal display device is provided to prevent a light guide plate or diffusion plate from deforming or displacing. The backlight unit comprises a light source; a plurality of optical sheets disposed between the light source and a liquid crystal display panel; a light guide plate disposed between the light source and the plurality of optical sheets; a cover bottom disposed below the light guide plate; and a guide holder fixed to edges of the cover bottom to hold a lower surface and sides of the light guide plate at peripheral of the light guide plate, wherein the guide holder includes a base block facing to the lower surface of the light guide plate and at least one side wall extended from the base block to be opposite to a side of the light guide plate.

20 Claims, 9 Drawing Sheets

(56) References Cited

U.S. PATENT DOCUMENTS

| | | | |
|---|---|---|---|
| 8,008,570 B2* | 8/2011 | Han et al. .................. 84/731 |
| 8,649,162 B2* | 2/2014 | Jang et al. ............ 361/679.02 |
| 2004/0109123 A1 | 6/2004 | Lee et al. |
| 2005/0231659 A1* | 10/2005 | Lee .............................. 349/58 |
| 2008/0143918 A1* | 6/2008 | Kim ............................. 349/58 |
| 2009/0128730 A1* | 5/2009 | Hsu et al. .................... 349/58 |
| 2010/0149835 A1* | 6/2010 | Cho et al. .................. 362/612 |
| 2011/0128756 A1 | 6/2011 | Cho et al. |

FOREIGN PATENT DOCUMENTS

| | | |
|---|---|---|
| KR | 2004-0049571 | 6/2004 |
| KR | 2005-0121047 | 12/2005 |
| KR | 2006-0073866 | 6/2006 |
| KR | 2008-0024569 | 3/2008 |
| KR | 2011-0059955 | 6/2011 |

OTHER PUBLICATIONS

Chinese Office Action issued in Chinese Patent Application No. 201210144542.7 on Oct. 30, 2014.

\* cited by examiner

BACKLIGHT UNIT FOR LIQUID CRYSTAL DISPLAY DEVICE

This application claims the priority and the benefit of Korea Patent Application No. 10-2011-0092978 on Sep. 15, 2011, the entire contents of which is incorporated herein by reference as if fully set forth herein.

BACKGROUND OF THE DISCLOSURE

Field of the Disclosure

Embodiments of this disclosure relate to a backlight unit for a liquid crystal display device.

Discussion of the Related Art

Liquid crystal displays have been widely used in various application fields because of advantages such as miniaturization, thin profile, and low power consumption. The liquid crystal displays have been used in notebook personal computers, office automatic equipments, audio/video equipments, indoor or outdoor signboards and so on. Transmissive liquid crystal displays control electric field applied to a liquid crystal layer and modulate light from a backlight unit to display images on a screen.

The backlight unit is classified into a direct type backlight unit and an edge type backlight unit. The direct type backlight unit has a structure that a plurality of light sources are arranged below a light guide plate to allow light to directly proceed to a front surface of an liquid crystal panel. The edge type backlight unit has a structure that a plurality of light sources are disposed to face a side of a light guide plate and a plurality of optical sheets are disposed between a liquid crystal panel and the light guide plate. In the edge type backlight unit, when the light sources irradiate light to one side of the light guide plate, the light guide plate converts linear light or point light emitted from the light sources into planar light and makes the planar light proceed to a front surface the liquid crystal panel.

The backlight unit includes a guide structure which guides the light guide plate or the diffusion plate according to expansion, shrink or displacement of the light guide plate or the diffusion plate caused by temperature variation, humidity variation, vibration or shock. The guide structure of the light guide plate or the diffusion plate is implemented by a protrusion structure having a pin shape which is inserted into a groove formed in edge of the light guide plate or the diffusion plate. In general, the guide structure is protruded from a cover bottom which constitutes a lower sash. The protrusion structure is known as a cauking pin or a guide pin, and is disclosed in Korean Patent Application Publication Nos. 10-2011-0059955 (Jun. 8, 2011) and 10-2005-0121047 (Dec. 26, 2005).

The cost of manufacturing the cover bottom rises because the cauking pin is made of the same metal material as the cover bottom in general and is integral with the cover bottom. That is, the cauking pin makes the manufacturing cost of the cover bottom high. If a thickness of the cover bottom is formed thin in order to resolve the problem of the cost, the cauking pin is easily bended. The cover bottom has to have a sufficient number of the cauking pins so as to stably guide the light guide plate or the diffusion plate because the cauking pin is point-contacted with the light guide plate or the diffusion plate. However, the cauking pin made from metal material reflects light. Accordingly, there is a problem that light by reflected by the cauking pins is displayed on a screen of the liquid crystal display panel to degrade image quality.

SUMMARY

An object of this disclosure is to provide a backlight unit for a liquid crystal display for preventing a light guide plate or diffusion plate from deforming or displacing by absorbing external force and shock applied to the light guide plate or the diffusion plate when the light guide plate or the diffusion plate is displaced or deformed due to external factors such as variation of temperature, variation of humidity, vibration, shock and so on.

Additional features and advantages of this disclosure will be set forth in the description which follows, and in part will be apparent from the description, or may be learned by practice of this disclosure. The objectives and other advantages of this disclosure will be realized and attained by the structure particularly pointed out in the written description and claims hereof as well as the appended drawings.

To achieve these and other advantages and in accordance with the purpose of this disclosure, as embodied and broadly described, a backlight unit for a liquid crystal display device according to one embodiment of this disclosure, comprises a light source for irradiating light; a plurality of optical sheets disposed between the light source and a liquid crystal display panel; a light guide plate disposed between the light source and the plurality of optical sheets to convert light from the light source into planar light and make the planar light proceed to the plurality of the optical sheets; a cover bottom disposed below the light guide plate; and a guide holder fixed to edges of the cover bottom to hold a lower surface and sides of the light guide plate at peripheral of the light guide plate.

A backlight unit for a liquid crystal display device according to one embodiment of this disclosure comprises a light source for irradiating light; a plurality of optical sheets disposed between the light source and a liquid crystal display panel; a diffusion plate disposed between the light source and the plurality of optical sheets and diffusing light from the light source to illustrate the diffused light to the plurality of optical sheets; a cover bottom disposed below the light guide plate; and a guide holder fixed to edges of the cover bottom to hold a lower surface and sides of the light guide plate at peripheral of the light guide plate.

The guide holder includes a base block facing to a lower surface of peripheral of the diffusion plate and at least one side wall extended from the base block to be opposite to a side of the diffusion plate.

The guide holder is made of a plastic-based material.

The at least one side wall includes a plurality of side walls which are separated from each other by slots.

The guide holder has a black color or a gray tone color.

The base block includes a screw guide hole, a first boss guide hole, and second boss guide hole, wherein the cover bottom includes a first and a second bosses protruded from the cover bottom to face the first and second boss guide holes, and a tapped hole facing the screw guide hole, and wherein the first and second bosses are inserted into the first and second boss guide holes, respectively, and a screw is inserted into the tapped hole via the screw guide hole.

The guide holder includes a boss protruded from a lower surface thereof, the cover bottom includes a hole into which the boss is insertible, and the boss of the guide holder is inserted into the hole of the cover bottom.

The guide holder includes a hook protruded from a lower surface thereof, the cover bottom includes a hole into which the hook is insertible, and the hook of the guide holder is inserted into the hole of the cover bottom.

The guide holder is attached to the cover bottom by a double-sided tape.

In this disclosure, the guide holders having L character cross-sectional shape and made of plastic-based material are fixed to the cover bottom in minimum number, and hold the light guide plate or diffusion plate. As a result, it is possible to cancel cauking pins from the cover bottom, thereby capable of making a structure of the covet bottom simple and lowering a manufacturing cost. Also, it is possible to prevent the light guide plate from deforming or displacing because the guide holder can absorbs external force or shock from the light guide plate or the diffusion plate due to external factors such as temperature variation, humidity variation, vibration, shock and so on. Further, it is possible to minimize light refracted from the guide holder to the light guide plate because the guide holder has a dark color such as a black color or a gray tone color.

BRIEF DESCRIPTION OF THE DRAWINGS

The accompanying drawings, which are included to provide a further understanding of this disclosure and are incorporated in and constitute a part of this specification, illustrate implementations of this disclosure and together with the description serve to explain the principles of the disclosure. In the drawings.

DETAILED DESCRIPTION

Figure 1:
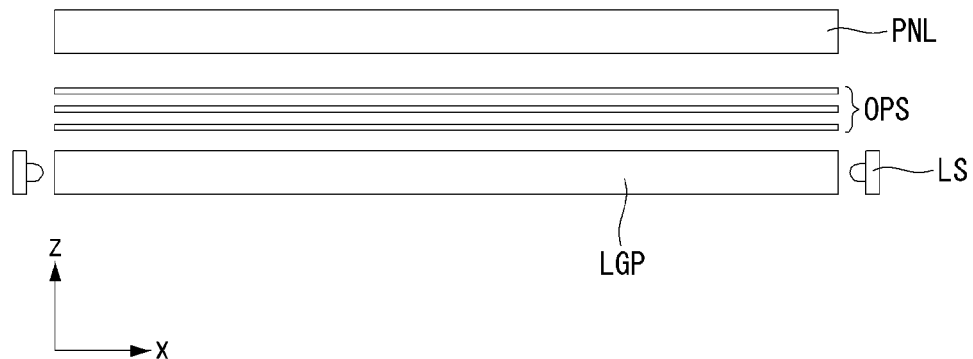
FIG. 1 is a cross-sectional view illustrating a liquid crystal display device according to a first embodiment of this disclosure.

Hereinafter, examples of various embodiments will be described in detail with reference to drawings. Like reference numerals designate like elements throughout the specification.

Figure 2:
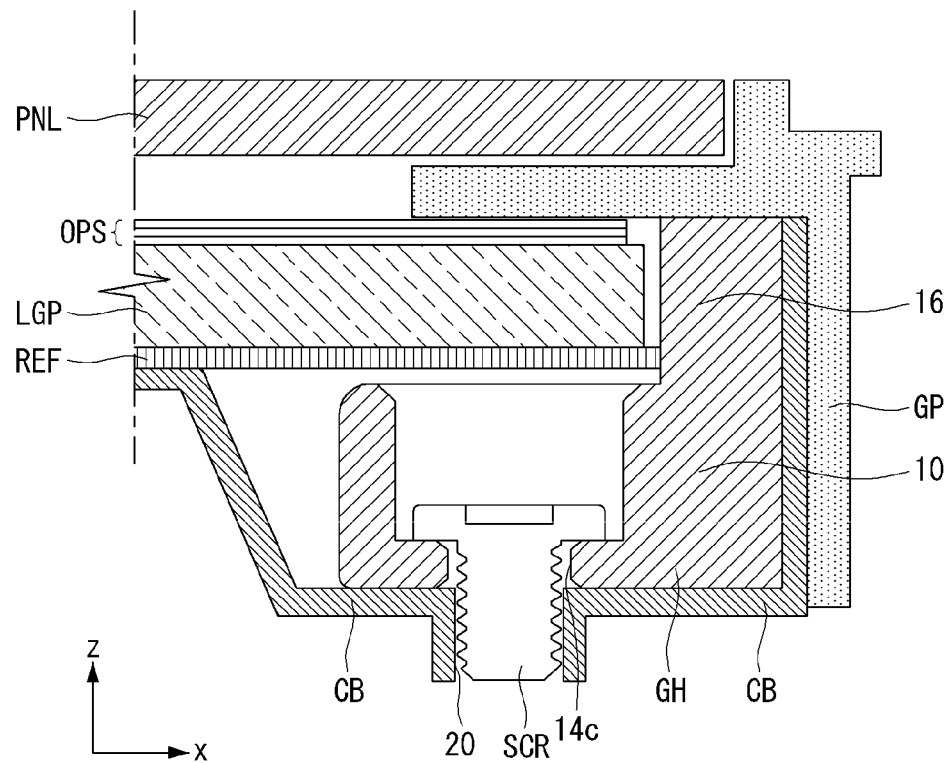
FIG. 2 is a cross-sectional view illustrating a cover bottom, a guide holder and a light guide plate according to a first embodiment of this disclosure.
Figure 3:
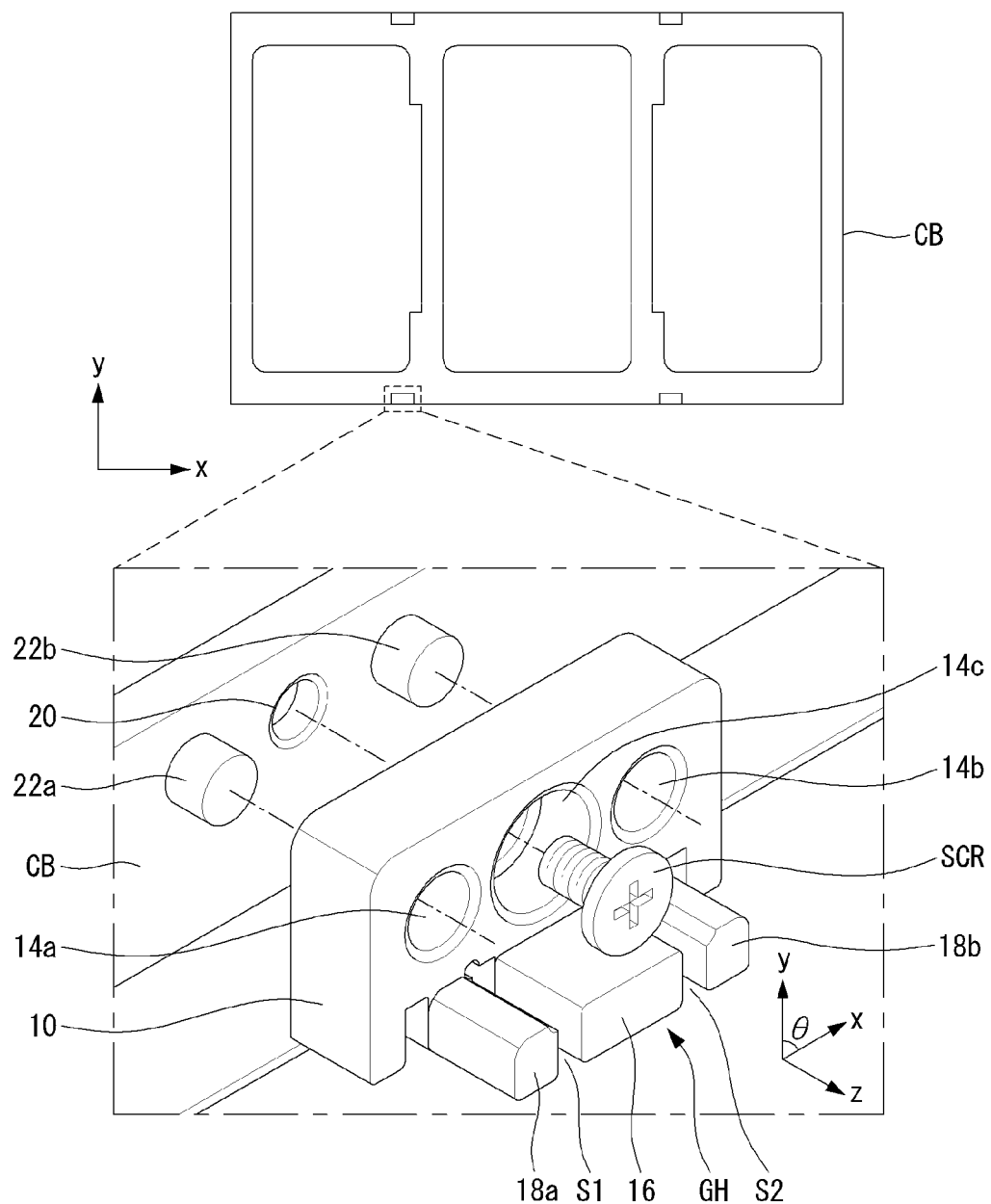
FIG. 3 is an exploded perspective view illustrating a cover bottom and a guide holder shown in FIG. 2.

Referring to FIGS. 1 to 3, a liquid crystal display device according to an embodiment of this disclosure includes a liquid crystal display panel PNL and an edge type backlight unit disposed below the liquid crystal display panel PNL.

The liquid crystal display panel PNL includes a liquid crystal layer between an upper glass substrate and a lower glass substrate and can be implemented in any liquid crystal mode.

The edge type backlight unit includes at least one light source LS, a light guide plate LGP, and a plurality of optical sheets OPS, and converts linear or point light emitted from the light source LS into planar light via the light guide plate LGP and the optical sheets OPS to illustrate the planar light on the liquid crystal display panel PNL.

The light source LS includes at least one of a light emitting diode (LED), CCFL (Cold Cathode Fluorescent Lamp), EEFL (External Electrode Fluorescent Lamp) and so on. The light source LS is disposed to face a side (or light incident surface) of the light guide plate LGP and illustrates linear light or point light to the side of the light guide plate LGP. The light guide plate LGP is a plate member formed of a transparent plastic such as polymethylmethacrylate (PMMA) to convert the linear or point light from the light source into the planar light. The optical sheets OPS include at least one prism sheet and at least one diffusion sheet to diffuse the planar light from the light guide plate and diffract the diffused light in substantial perpendicular direction to light incident surface of the liquid crystal display panel PNL.

The liquid crystal display panel PNL and the edge type backlight unit are assembled with a guide panel GP, a cover bottom CB, a case top (not shown), and a guide holder GH to implement a liquid crystal module LCM.

The guide panel GP supports side surfaces and a portion of a lower surface of the liquid crystal display panel PNL to constantly maintain a space between the liquid crystal display panel PNL and the optical sheets OPS. The guide panel GP is formed of plastic-based material such as polycarbonate (PC) which can be formed by a mold. The case top encompasses sides of the guide panel GP and the cover bottom CB and is fixed to the guide panel GP and the cover bottom CB by a fastening method such as a screw or screwless fasten method. The case top and the cover bottom CB may be formed of metal plate member such as EGI (Electrolytic Galvanized Iron), SUS (Steel Use Stainless), galvalume (e.g. SGLC), alumina coated steel plate (e.g. ALCOSTA), tin coated steel plate (e.g. SPTE) and so on.

A reflective plate REF is disposed between the cover bottom CB and the light guide plate LGP so as to improve efficiency of light incident to the liquid crystal display panel PNL by reflecting light from the light guide plate LGP. The reflective plate REF is attached to the cover bottom CB.

The guide holder GH is formed of plastic-based material like as the light guide plate LGP. For example, the plastic-based material may include polycarbonate (PC) which can be formed by a mold. The guide holder GH holds the light guide plate LGP in replace with a cauking pin having a simple structure. The guide holder GH is fixed to the cover bottom CB at inner peripheral of the cover bottom CB by a screw SCR and bosses 22a and 22b as shown in FIGS. 2 and 3. The guide holder GH has L character cross-sectional shape and holds a lower surface and sides of the light guide plate LGP at peripheral of the light guide plate LGP to prevent the peripheral of the light guide plate LGP from hanging down.

The guide holder GH is expanded and shrunk similar to the light guide plate LGP when temperature variation, humidity variation, vibration or shock is generated because the guide holder GH is made of plastic-based material similar to the light guide plate LGP. In particular, because the guide holder GH is made of plastic-based material which is softer and more excellent in absorbing external force or shock than metal material, the guide holder GH can suppress external force or shock transferred from the light guide plate LGP and reduce noises when the light guide plate LGP is expanded, shrunk or displaced by temperature variation, humidity variation, vibration or shock. Accordingly, the guide holder GH suppresses the displacement and hanging down phenomenon of the light guide plate LGP to improve reliability of the liquid crystal display device.

All of the guide holder GH or a portion of the guide holder GH facing to the light guide plate LGP has black color or gray tone color so that light reflected by the guide holder GH may be minimized.

Figure 4:
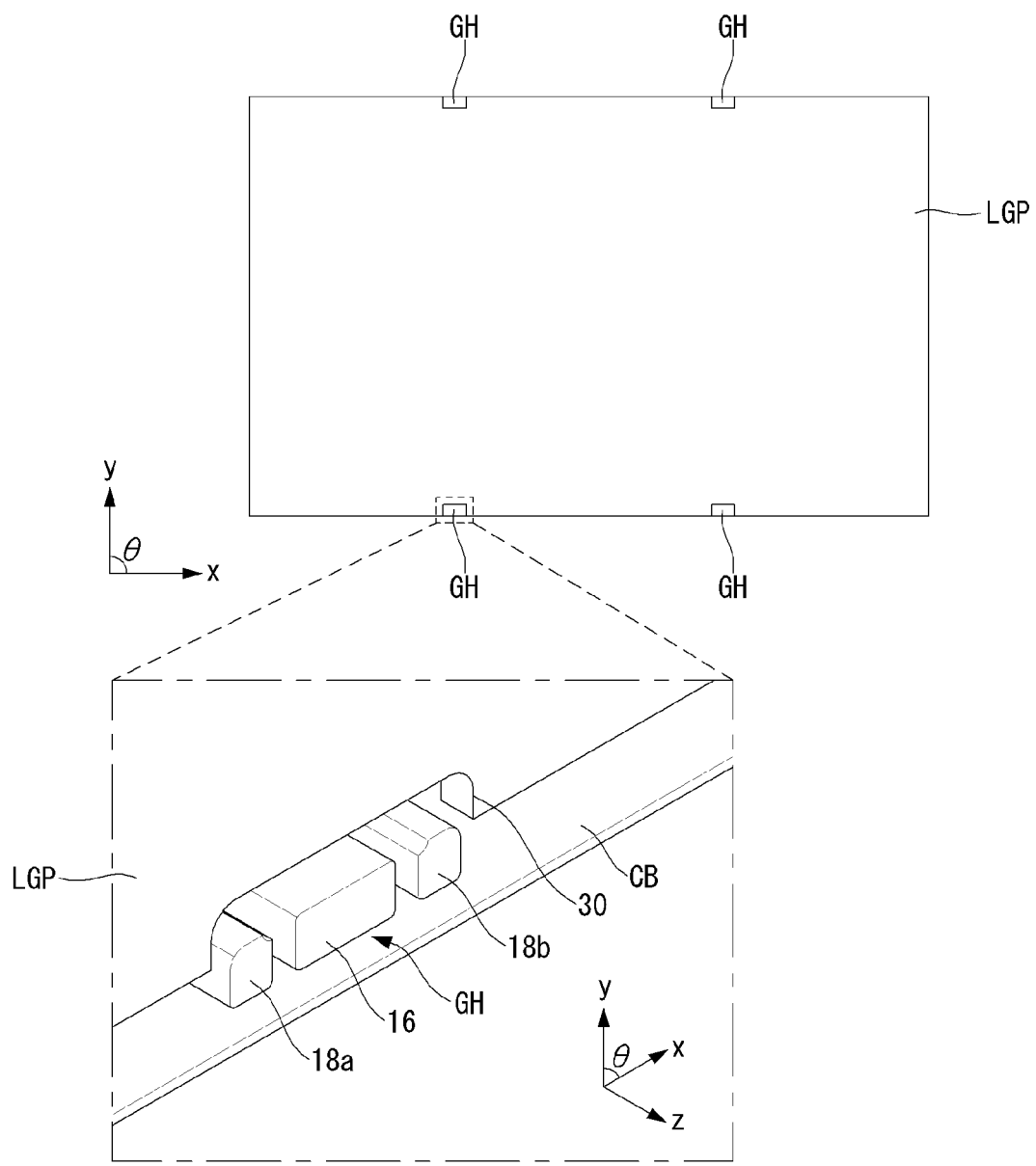
FIG. 4 is a perspective view illustrating an assembled state in which a cover bottom, a guide holder and a light guide plate are assembled with each other.

The guide holder GH has L character cross-sectional shape and includes a base block 10, and first to third side walls 16, 18a and 18b vertically extended in z axis direction from the base block 10 as shown in FIGS. 2 to 4. The base block 10 includes a first and second boss guide holes 14a and 14b, and a screw guide hole 14c, and supports a lower portion of the light guide plate LGP.

The cover bottom CB includes a tapped hole 20 corresponding to the screw guide hole 14c of the guide holder GH, bosses 22a and 22b protruded from the cover bottom CB at positions corresponding to the boss guide holes 14a and 14b, respectively. The screw SCR is inserted into the tapped hole 20 of the cover bottom CB through the screw guide hole 14c of the guide holder GH to fix the guide holder GH to the cover bottom CB along z axis. The bosses 22a and 22b of the cover bottom CB are inserted into the boss guide holes 14a and 14b of the guide holder GH to prevent the guide holder GH from rotating along θ direction on a plane of the cover bottom CB formed by x and y axes.

Figure 5:
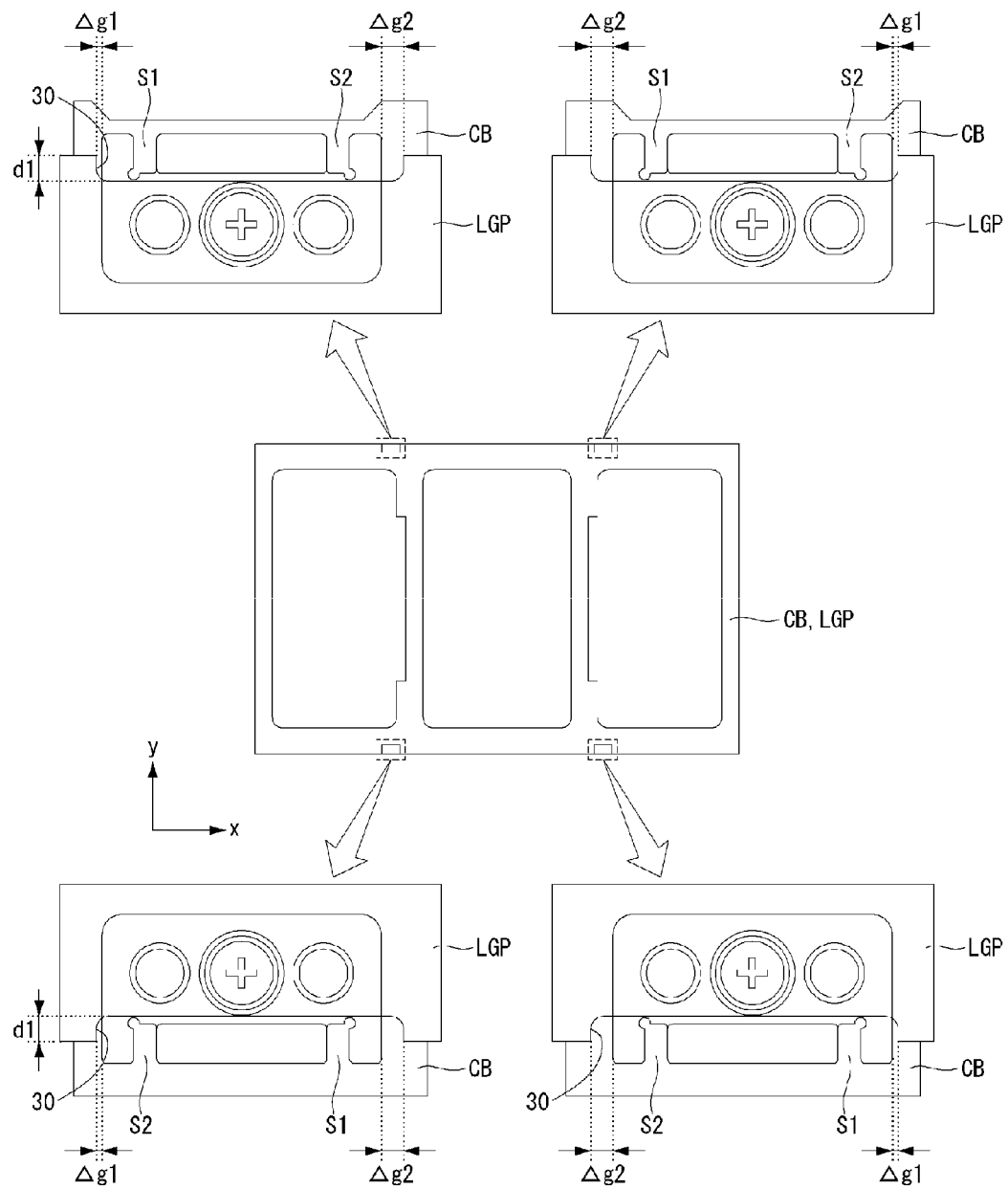
FIG. 5 is a view illustrating guide holders disposed on four positions of a liquid crystal display according to a first embodiment of this disclosure.

The side walls 16, 18a and 18b of the guide holder GH are disposed to face one side of the light guide plate LGP to prevent the light guide plate LGP moving along y axis on the plane formed by x and y axes. Slots S1 and S2 are formed between the side walls 16, 18a and 18b of the guide holder GH. The side walls 16, 18a and 18b are separated from each other by the slots S1 and S2. A groove 30 is formed in peripheral of the light guide panel LGP to receive the side walls 16, 18a and 18b of the guide holder GH. As shown in FIG. 5, a first gap Δ g1 is formed between any one of side walls 18a and 18b of the guide holder GH and the groove 30 of the light guide plate LGP, and a second gap Δ g2 is formed between another one of side walls 18a and 18b of the guide holder GH and the groove 30 of the light guide plate LGP. The first gap Δ g1 may be set about 0.2 mm, and the second gap Δ g2 may be set about 2.0 mm. A width of each of the slots S1 and S2 between side walls 16, 18a and 18b may be set about 2.0 mm or more than 2.0 mm. The slots S1 and S2 and the gaps Δ g1 and Δ g2 form spaces between the side walls 16, 18a 18b of the guide holder GB and the light guide plate LGP to absorb external force and shock applied from the light guide plate LGP to the guide holder GH when the light guide plate LGP is expanded, shrunk or displaced by external factor such as temperature variation, humidity variation, vibration or shock.

The guide holder GH is formed to increase contact area between the guide holder GH and the light guide panel LGP by linear-contact or planar-contact between the guide holder GH and the light guide plate LGP. The guide holder GH is also formed of material capable of absorbing the external force from the light guide panel LGP. Accordingly, it is possible to achieve effect the same as the twelve cauking pins even if the guide holder GH is formed at four positions of the light guide plate LGP of the liquid crystal display device as shown in FIGS. 3 and 5.

The conventional cauking pins have to have at least a thickness of 3 mm so as to prevent the cauking pins from bending when force from the light guide plate LGP is applied thereto. In this case, the depth of the groove of the light guide plate LGP into which the cauking pin inserted is set to a size similar to diameter of the cauking pin. The guide holder GH of this disclosure is neither bended nor separated from the light guide plate LGP even though the number of the guide holder is less than that of the cauking pins GH because a contact area which the guide holder GH is contacted with the light guide plate LGP is large and the guide holder GH is made of material capable of absorbing the external force and shock from the light guide plate LGP. Also, it is possible to make a thickness of the side walls 16a, 18a and 18b of the guide holder GH thin because the guide holder GH is formed material capable of absorbing the external force or shock from the light guide plate LGP and has a structure capable of holding sides and lower surfaces of the light guide plate LGP in a wide area. Accordingly, it is possible that the depth d1 of the groove of the light guide plate LGP which receives the side walls 16, 18a and 18b of the guide holder GH is become small as shown in FIG. 5.

Figure 6:
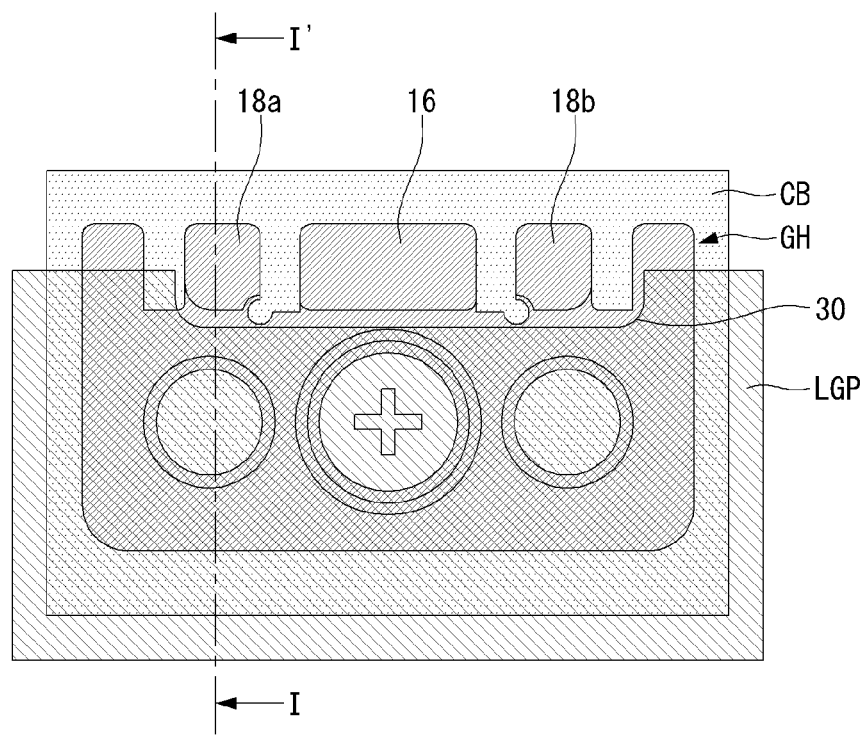
FIG. 6 is a plan view illustrating an assembled state in which a cover bottom, a guide holder and a light guide plate are assembled with each other.
Figure 7:
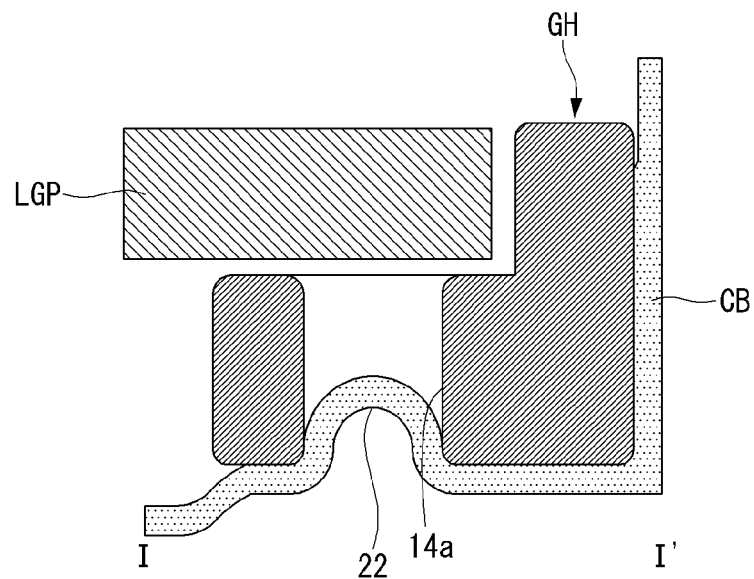
FIG. 7 is a cross-sectional view taken along line I-I' of FIG. 6, which illustrates an one example of an assembled structure of the cover bottom and the light guide plate.
Figure 8:
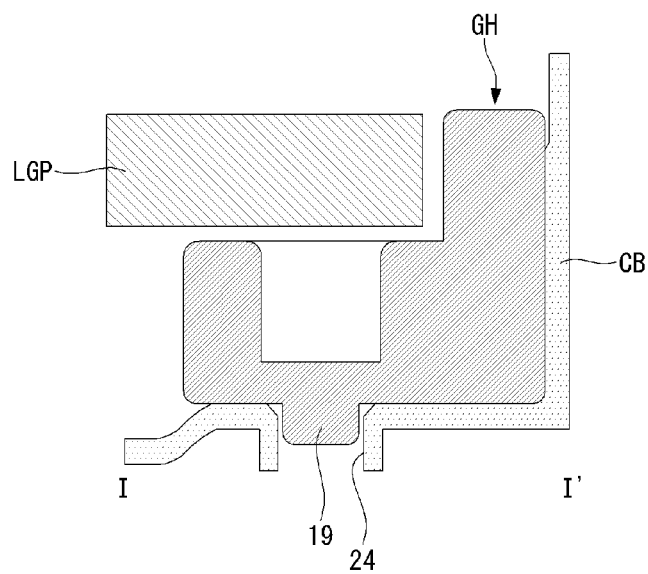
FIG. 8 is a cross-sectional view taken along line I-I' of FIG. 6, which illustrates an another example of an assembled structure of the cover bottom and the light guide plate.

FIG. 6 is a plan view illustrating a state which the cover bottom, the guide holder and the light guide plate are assembled with each other. FIG. 7 is a cross-sectional view illustrating one example of an assemble structure of the cover bottom and the light guide plate taken along line I-I' of FIG. 6. FIG. 8 is a cross-sectional view illustrating another example of an assemble structure of the cover bottom and the light guide plate taken along line I-I' of FIG. 6.

Referring to FIG. 7, a boss 22 protruded from a lower surface of the cover bottom CB may be inserted into a boss guide holes 14a of the guide holder GH. Referring to FIG. 8, a boss 19 protruded from a lower surface of the cover bottom CB may be inserted into a hole 24 passing through the cover bottom CB.

Figure 9:
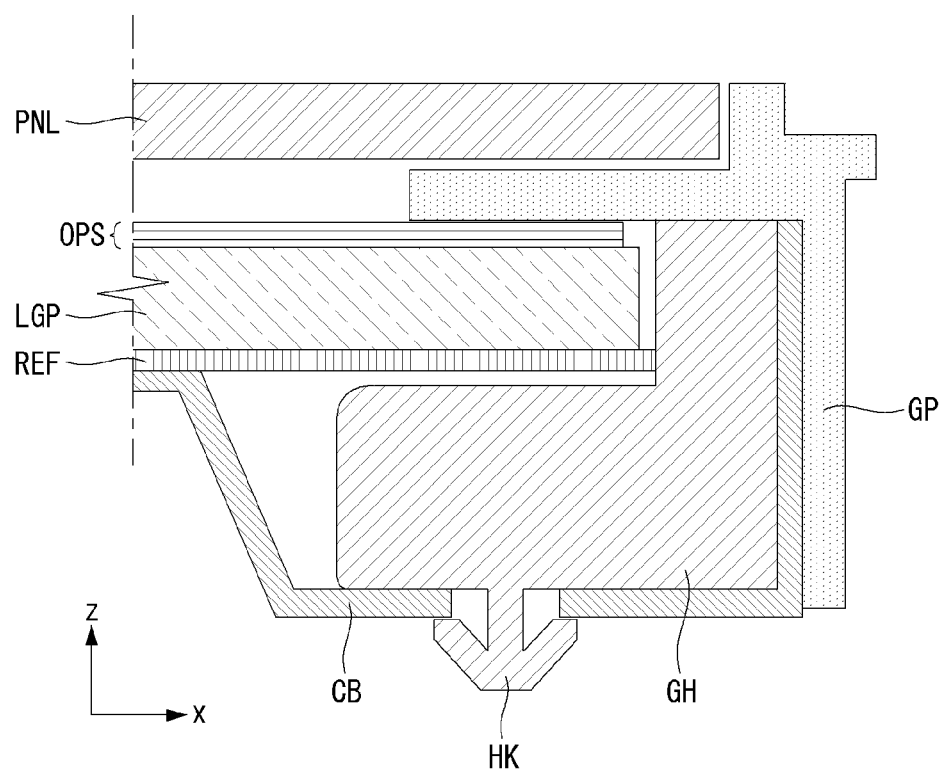
FIG. 9 is a cross-sectional view illustrating a guide holder according to a second embodiment of this disclosure.
Figure 10:
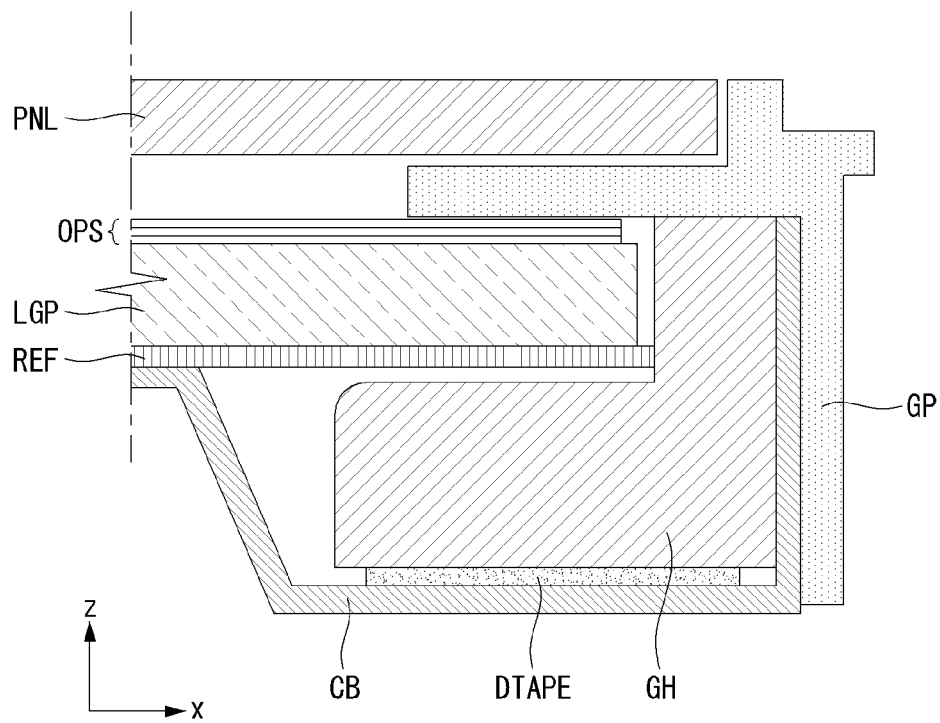
FIG. 10 is a cross-sectional view illustrating a guide holder according to a third embodiment of this disclosure.

FIG. 9 is a cross-sectional view illustrating a guide holder GH according to a second embodiment of this disclosure, and FIG. 10 is a cross-sectional view illustrating a guide holder according to a third embodiment of this disclosure.

The guide holder GH can be assembled with the cover bottom CB without any screw. For example, referring to FIG. 9, a hook HK is formed on a lower surface of the guide holder GH, and a hole is formed in the cover bottom CB to face to the hook HK. The guide holder GH is assembled with the cover bottom CB by hanging the hook HK of the guide holder GH on peripheral of the hole of the cover bottom CB. Referring to FIG. 10, the guide holder GH can be attached to the cover bottom CB by a double-sided tape DTAPE.

As mentioned above, the guide holder GH can be assembled with the cover bottom CB by the bosses and the screw as shown in FIGS. 2 to 5. Alternatively, the guide holder GH is assembled with the cover bottom CB by the bosses and then the guide holder GH is fixed to the cover bottom CB by the double-sided tape DTAPE or the hook HK as shown in FIGS. 6 to 10.

Figure 11:
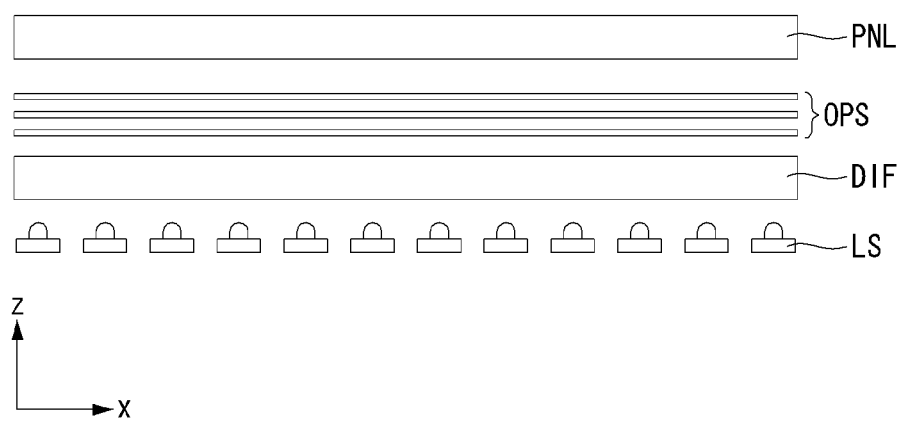
FIG. 11 is a cross-sectional view illustrating a liquid crystal display device according to second embodiment of this disclosure.
Figure 12:
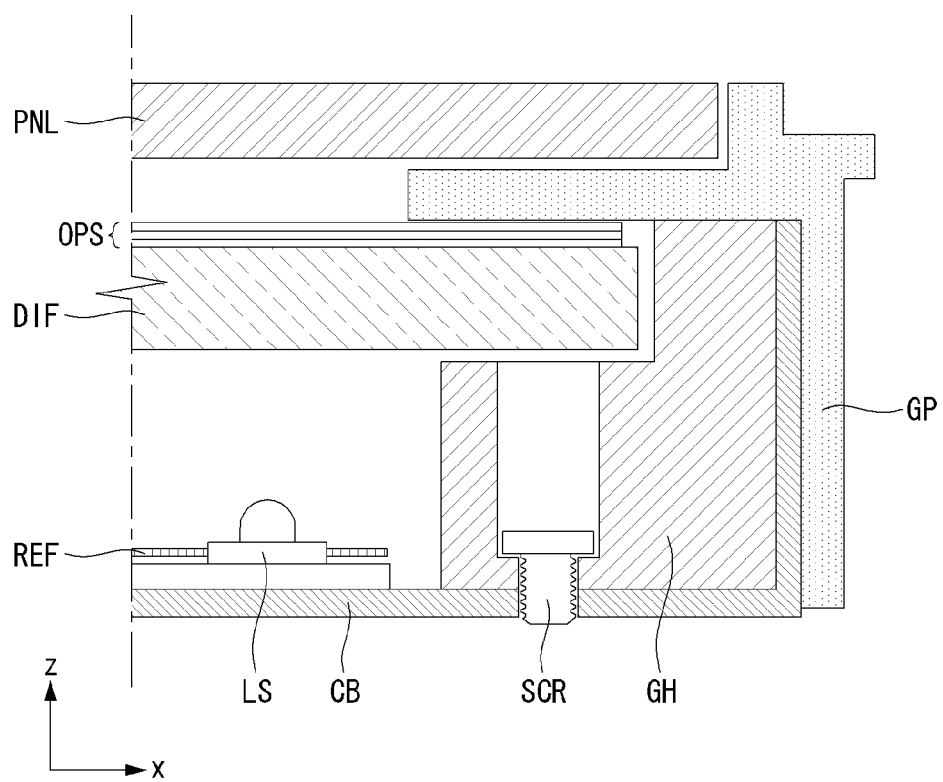
FIG. 12 is a cross-sectional view illustrating the guide holder GH shown in FIG. 11.

FIG. 11 is a cross-sectional view illustrating a liquid crystal display device according to second embodiment of this disclosure. FIG. 12 is a cross-sectional view illustrating the guide holder GH shown in FIG. 11.

Referring to FIGS. 11 and 12, the liquid crystal display device includes a liquid crystal display panel PNL and a direct type backlight unit disposed under the liquid crystal display panel PNL.

The direct type backlight unit has a diffusion plate DIF, a plurality of light sources LS disposed below the diffusion plate DIF, a plurality of optical sheets OPS disposed above the diffusion plate DIF. The direct type backlight unit converts light from the light sources LS into planar light via the diffusion plate DIF and the optical sheets OPS and illustrates the planar light on the liquid crystal display panel PNL.

The diffusion plate DIF is plate member formed of a transparent plastic material such as polymethlymethacrylate (PMM) in which a plurality of beads are dispersed. The beads of the diffusion plate DIF scatter light from the light sources LS and diffuse the scattered light. The optical sheets OPS includes at least one prism sheet and at least one diffusion sheet to diffuse the light from the diffusion plate DIF. The optical sheets OPS also diffract a progress path of the light in perpendicular to a light incident surface of the liquid crystal display panel PNL.

The liquid crystal display panel PNL and the direct type backlight unit are assembled with a guide panel GP, a cover bottom CB, a case top (not shown) and a guide holder GH to implement a liquid crystal module LCM.

The guide panel GP supports edges including sides and lower surface of the liquid crystal display panel PNL at peripheral of the liquid crystal display panel PNL. The guide panel GP supports the liquid crystal display panel PNL and constantly maintains a space between the liquid crystal display panel PNL and the optical sheets OPS. The case top encompasses sides of the guide panel GP and the cover bottom CB and is fixed to the guide panel GP and the cover bottom CB by a fastening method such as a screw or screw-less fastening method.

A refection plate REF is disposed between the cover bottom CB and the diffusion plate DIF to reflect the light from the light sources LS and the diffusion plate DIF, thereby increasing an efficiency of light incident to the liquid crystal display panel PNL. The reflection plate REF is attached to the cover bottom CB.

The guide holder GH is made of a plastic-based material similar to the diffusion plate DIF. For example, the plastic material includes polycarbonate (PC) which can be formed by a mold. The guide holder GH holds the diffusion plate DIF. The guide holder GH may be fixed to the cover bottom CB by the screw SCR and the bosses. Alternatively, the guide holder GH may be fixed to the cover bottom CB by the hook HK or the double-sided tape DTAPE as shown in FIGS. 9 and 10. The guide holder GH has L character cross-sectional shape, and holds a lower surface and sides of the diffusion plate DIF at peripheral of the diffusion plate DIF, thereby prevent peripheral of the diffusion plate DIF from hanging down.

The guide holder GH is expanded or shrunk similar to the diffusion plate DIF. In particular, because the guide holder GH is made of plastic-based material which is softer and more excellent in absorbing external force or shock than metal material, the guide holder GH can suppress external force or shock transferred from the light guide plate LGP and reduce noises when the light guide plate LGP is expanded, shrunk or displaced by temperature variation, humidity variation, vibration or shock. Accordingly, the guide holder GH suppresses the displacement and hanging down phenomenon of the light guide plate LGP to improve reliability of the liquid crystal display device.

All of the guide holder GH or a portion of the guide holder GH facing to the diffusion plate DIF has a black color or gray tone color so that the reflected light is minimized.

The guide holder GH of FIG. 12 is assembled with the cover bottom CB by the screw-less method as shown in FIGS. 8 and 9. The guide holder GH of FIG. 12 may be assembled with the cover bottom CB by the bosses and the screw as shown in FIGS. 2 to 5. Alternatively, the guide holder GH of FIG. 12 may be assembled with the cover bottom CB by coupling the guide holder GH with the cover bottom CB using the bosses and then fixing the guide holder GH to the cover bottom CB using the double-sided tape or hook HK as shown in FIGS. 6 to 10.

Although the embodiments of this disclosure have been described with reference to a number of illustrative examples, it should be understood that numerous other modifications and changes can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A backlight unit for a liquid crystal display device, comprising:
   a light source for irradiating light;
   a plurality of optical sheets disposed between the light source and a liquid crystal display panel;
   a guide panel for supporting side surfaces and a portion of a lower surface of the liquid crystal display panel to maintain a space between the liquid crystal display panel and the plurality of optical sheets;
   a light guide plate disposed under the plurality of optical sheets to convert light from the light source into planar light and make the planar light proceed to the plurality of the optical sheets;
   a cover bottom disposed below the light guide plate; and
   a plurality of guide holders fixed to an edge of the cover bottom and spaced apart in an interval,
   wherein each of the guide holders includes:
      a base block disposed under the light guide plate and fixed to an inner bottom surface of the cover bottom, and
      at least one side wall extended from the base block,
   wherein the at least one side wall is spaced apart from the light guide plate,
   wherein the base block of the guide holder supports a lower portion of the light guide plate, and the at least one side wall of the guide holder supports a lower portion of the guide panel,
   wherein any one of the cover bottom and the base block includes at least one first hole,
   wherein another one of the cover bottom and the base block includes at least one coupling member protruded therefrom to face the at least one first hole, and
   wherein the at least one coupling member is coupling into the at least one first hole.

2. The backlight unit of claim 1, wherein the guide holder is made of a plastic-based material.

3. The backlight unit of claim 1, wherein the at least one side wall includes a plurality of side walls which are separated from each other by slots.

4. The backlight unit of claim 1, wherein the guide holder has a black color or a gray tone color.

5. The backlight unit of claim 1, wherein the base block further includes a second hole under the light guide plate,
 wherein the cover bottom further includes a tapped hole at the inner bottom surface and facing the second hole, and
 wherein a screw is inserted into the tapped hole via the second hole to fix the base block to the cover bottom.

6. The backlight unit of claim 1, wherein the at least one coupling member of the guide holder includes a boss protruded from a lower surface of the base block, and
 wherein the cover bottom includes the at least one first hole into which the boss of the guide holder is inserted.

7. The backlight unit of claim 1, wherein the guide holder includes a hook protruded from a lower surface of the base block, and
 wherein the cover bottom includes the at least one first hole into which the hook of the guide holder is inserted.

8. The backlight unit of claim 1, wherein the guide holder is attached to the cover bottom by a double-sided tape.

9. A backlight unit for a liquid crystal display device, comprising:
 a light source for irradiating light;
 a plurality of optical sheets disposed between the light source and a liquid crystal display panel;
 a guide panel for supporting side surfaces and a portion of a lower surface of the liquid crystal display panel to maintain a space between the liquid crystal display panel and the plurality of optical sheets;
 a diffusion plate disposed between the light source and the plurality of optical sheets and diffusing light from the light source to illustrate the diffused light to the plurality of optical sheets;
 a cover bottom disposed below the diffusion plate; and
 a plurality of guide holders fixed to an edge of the cover bottom and spaced apart in an interval,
 wherein each of the guide holders includes:
  a base block disposed under the diffusion plate and fixed to an inner bottom surface of the cover bottom, and
  at least one side wall extended from the base block,
 wherein the at least one side wall is spaced apart from the diffusion plate,
 wherein the base block of the guide holder supports a lower portion of the diffusion plate, and the at least one side wall of the guide holder supports a lower portion of the guide panel,
 wherein any one of the cover bottom and the base block includes at least one first hole,
 wherein another one of the cover bottom and the base block includes at least one coupling member protruded therefrom to face the at least one first hole, and
 wherein the at least one coupling member is coupling into the at least one first hole.

10. The backlight unit of claim 9, wherein the guide holder is made of a plastic-based material.

11. The backlight unit of claim 9, wherein the at least one side wall includes a plurality of side walls which are separated from each other by slots.

12. The backlight unit of claim 9, wherein the guide holder has a black color or a gray tone color.

13. The backlight unit of claim 9, wherein the base block further includes a second hole under the diffusion plate,
 wherein the cover bottom further includes a tapped hole at the inner bottom surface and facing the second hole, and
 wherein a screw is inserted into the tapped hole via the second hole to fix the base block to the cover bottom.

14. The backlight unit of claim 9, wherein the guide holder includes a boss protruded from a lower surface of the base block, and
 wherein the cover bottom includes the at least one first hole into which the boss of the guide holder is inserted.

15. The backlight unit of claim 9, wherein the at least one coupling member of the guide holder includes a hook protruded from a lower surface of the base block, and
 wherein the cover bottom includes the at least one first hole into which the hook of the guide holder is inserted.

16. The backlight unit of claim 9, wherein the guide holder is attached to the cover bottom by a double-sided tape.

17. The backlight unit of claim 3, wherein the light guide plate includes a groove, and
 wherein a first gap between one of the side walls and the groove of the light guide plate is narrower than a second gap between another one of the side walls and the groove of the light guide plate.

18. The backlight unit of claim 11, wherein the diffusion plate includes a groove, and
 wherein a first gap between one of the side walls and the groove of the diffusion plate is narrower than a second gap between another one of the side walls and the groove of the diffusion plate.

19. The backlight unit of claim 1, wherein the light guide plate includes a groove at which the at least one side wall is disposed.

20. The backlight unit of claim 9, wherein the diffusion plate includes a groove at which the at least one side wall is disposed.

* * * * *